(12) United States Patent
Kedor et al.

(10) Patent No.: US 12,372,185 B2
(45) Date of Patent: Jul. 29, 2025

(54) HYDROGEN PIPE COUPLING ARRANGEMENT WITH ENHANCED INNER SEALING

(71) Applicant: Airbus Operations GmbH, Hamburg (DE)

(72) Inventors: Florian Kedor, Hamburg (DE); Tran Quang Tue Nguyen, Hamburg (DE); Jörg Steiner, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 18/344,233

(22) Filed: Jun. 29, 2023

(65) Prior Publication Data
US 2024/0003476 A1    Jan. 4, 2024

(30) Foreign Application Priority Data

Jul. 1, 2022   (EP) .................................... 22182648

(51) Int. Cl.
*F16L 39/00*     (2006.01)
*F16L 59/065*    (2006.01)

(52) U.S. Cl.
CPC ........... *F16L 39/005* (2013.01); *F16L 59/065* (2013.01)

(58) Field of Classification Search
CPC .............................. B64D 37/30; F16L 39/005
See application file for complete search history.

(56) References Cited

U.S. PATENT DOCUMENTS

| 3,068,026 A | * | 12/1962 | McKamey | ............ | F16L 39/005 |
| | | | | | 62/50.7 |
| 3,275,345 A | * | 9/1966 | Waldron | ............... | F16L 39/005 |
| | | | | | 285/47 |
| 3,458,219 A | | 7/1969 | Wesch | | |
| 8,074,687 B2 | | 12/2011 | Queau et al. | | |
| 2005/0116466 A1 | | 6/2005 | Arosio | | |
| 2008/0169037 A1 | | 7/2008 | Ziegler | | |
| 2009/0243230 A1 | | 10/2009 | Myers et al. | | |

(Continued)

FOREIGN PATENT DOCUMENTS

| CN | 105069211 A | 11/2015 |
| CN | 205275203 U | 6/2016 |
| CN | 110822189 A | 2/2020 |

(Continued)

OTHER PUBLICATIONS

Soulie A., Hydrogen Pipe With Double Wall Comprising at Least One System for Detecting Leaks in at Least One Connection System, Aircraft Comprising at Least One Such Pipe, Mar. 29, 2023, EP 4155597.*

(Continued)

*Primary Examiner* — Matthew Troutman
*Assistant Examiner* — James A Linford
(74) *Attorney, Agent, or Firm* — Greer, Burns & Crain, Ltd.

(57) ABSTRACT

A coupling for a hydrogen pipe for coupling multi-wall pipe sections which is equipped with an inner seal and an outer seal and a pressing device that presses the pipe sections together. The hydrogen pipe coupling arrangement comprises at least one spring element configured to apply a pre-pressing force onto the inner seal in addition to a pressing force of the pressing device.

9 Claims, 7 Drawing Sheets

(56) References Cited

U.S. PATENT DOCUMENTS

2021/0061640 A1  3/2021  Umemura et al.
2021/0207759 A1  7/2021  Schulz et al.

FOREIGN PATENT DOCUMENTS

| CN | 111347366 A |   | 6/2020 |
|----|-------------|---|--------|
| DE | 3610947 A1  | * | 10/1987 |
| DE | 4031879 A1  | * | 4/1992 |
| EP | 1538385 A1  |   | 6/2005 |
| GB | 352894 A    | * | 7/1931 |

OTHER PUBLICATIONS

European Search Report for corresponding European Patent Application No. 22182648 dated Nov. 28, 2022; priority document.

* cited by examiner

HYDROGEN PIPE COUPLING ARRANGEMENT WITH ENHANCED INNER SEALING

CROSS-REFERENCES TO RELATED APPLICATIONS

This application claims the benefit of European Patent Application No. 22 182 648-0 filed on Jul. 1, 2022, the entire disclosure of which is incorporated herein by way of reference.

FIELD OF THE INVENTION

The invention relates to a hydrogen pipe coupling arrangement comprising a first multiple-wall hydrogen pipe section with a first coupling portion, a second multiple-wall hydrogen pipe section with a second coupling portion configured to be connected to the first coupling portion, a sealing arrangement for sealing the connection between the first and second coupling portions, and a pressing device for pressing the first coupling portion and the second coupling portion together. Further, the invention relates to a liquid hydrogen distribution system as well as to a vehicle, especially an aircraft, comprising such a hydrogen pipe coupling arrangement.

BACKGROUND OF THE INVENTION

For technical background of the invention, reference is made to the following citations:
[1] CN 110822189 A
[2] CN 105069211 A
[3] CN 111347366 A
[4] CN 205275203 A
[5] U.S. Pat. No. 3,458,219 A
[6] US 2009/243230 A1
[7] US 2021/0207759 A1

Citations [1] to [6] relate to pipe couplings for simple pipes wherein special measures have been made in order to increase a pressing force in the coupling. Citation [7] relates to a cryogenic pipe coupling arrangement.

SUMMARY OF THE INVENTION

At the present, much effort is made to power vehicles such as cars, trucks, aircrafts, especially airplanes and helicopters with hydrogen. Hence, hydrogen storage and distribution systems are needed onboard and on ground. One possibility is to store and distribute hydrogen as liquid hydrogen. Liquid hydrogen must be transported at extremely low temperature, hence transfer lines with optimal insulation is essential. For transportation of liquid hydrogen, cryogenic piping system can be used. Such cryogenic piping systems have multiple-wall pipe sections with an inner pipe and an outer pipe. Within the inner pipe, the cryogenic liquid is transported. A space between the inner pipe and the outer pipe can be evacuated or filled with a special gas for achieving a thermal insulation. One aspect of the invention relates to an enhanced coupling between such cryogenic pipe sections. Another aspect relates to an enhanced coupling between multiple-wall pipe sections for transporting gaseous hydrogen.

An object of the invention is to improve a coupling, especially a removable coupling, for hydrogen piping systems.

For achieving this object, the invention provides a hydrogen pipe coupling arrangement according to one or more embodiments. Advantageous uses of such hydrogen pipe coupling arrangements are given in the further embodiments. Advantageous embodiments are also disclosed herein.

The invention provides according to a first aspect thereof a hydrogen pipe coupling arrangement comprising a first multiple-wall hydrogen pipe section with a first coupling portion, a second multiple-wall hydrogen pipe section with a second coupling portion configured to be connected to the first coupling portion, a sealing arrangement for sealing the connection between the first and second coupling portions and a pressing device for pressing the first coupling portion and the second coupling portion together. The first multiple-wall hydrogen pipe section has a first inner pipe and a first outer pipe. The first coupling portion comprises a first inner annular joint section on the first inner pipe and a first outer annular joint section on the first outer pipe. The second multiple-wall hydrogen pipe has a second inner pipe to be connected in fluid-communication to the first inner pipe and a second outer pipe to be connected to the first outer pipe. The second coupling portion has a second inner annular joint section on the second inner pipe configured to be connected with the first inner annular joint section to form an inner pipe joint. The second coupling section further has a second outer annular joint section on the second outer pipe configured to be connected with the first outer annular joint section in order to form an outer pipe joint. The sealing arrangement has an inner seal configured to seal the inner pipe joint and an outer seal configured to seal the outer pipe joint. The hydrogen pipe coupling arrangement further comprises at least one spring element configured to apply a pre-pressing force onto the inner seal in addition to the pressing force of the pressing device.

Preferably, the hydrogen pipe coupling arrangement comprises a first spring element on the first inner pipe and a second spring element on the second inner pipe.

Preferably, the hydrogen pipe coupling arrangement is a cryogenic pipe coupling arrangement wherein the multiple-wall hydrogen pipe sections are multiple-wall cryogenic pipe section for conducting liquid $H_2$.

Preferably, at least one of the inner annular joint sections is elastically supported in an axial direction by the at least one spring element.

Preferably, the inner and outer joint sections are arranged such that, in an uncoupled state, the inner joint sections are closer to each other as the outer joint sections. Especially, at least one of the inner joint sections is elastically supported by the spring element. Preferably the first inner joint section is elastically supported, preferably in the axial direction, by the first spring element, and the second inner joint section is elastically supported by the second spring element.

Figure 10:
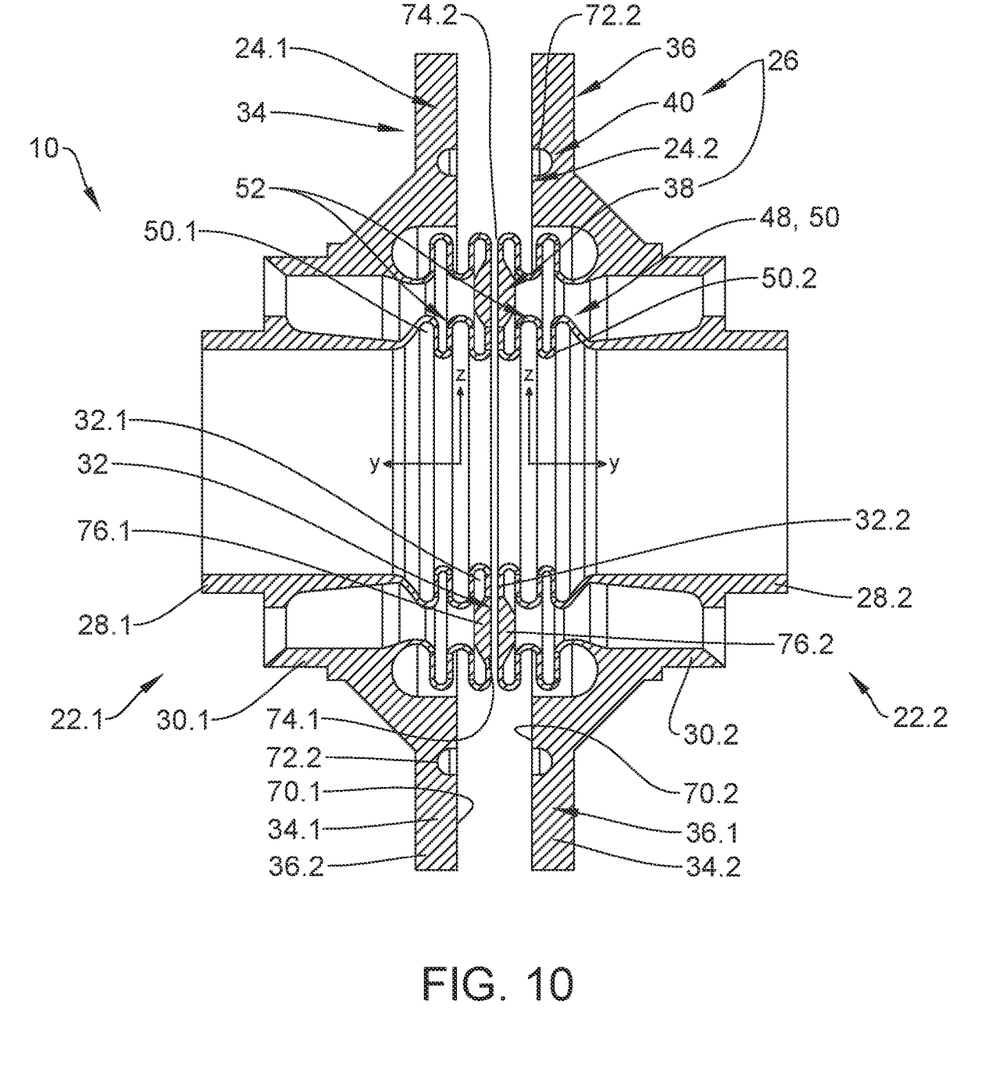
FIG. 10 is a schematic sectional view of a pipe coupling arrangement for conducting $LH_2$ or $GH_2$ according to a second embodiment in an unloaded state before assembling (single flange concept)
Figure 11:
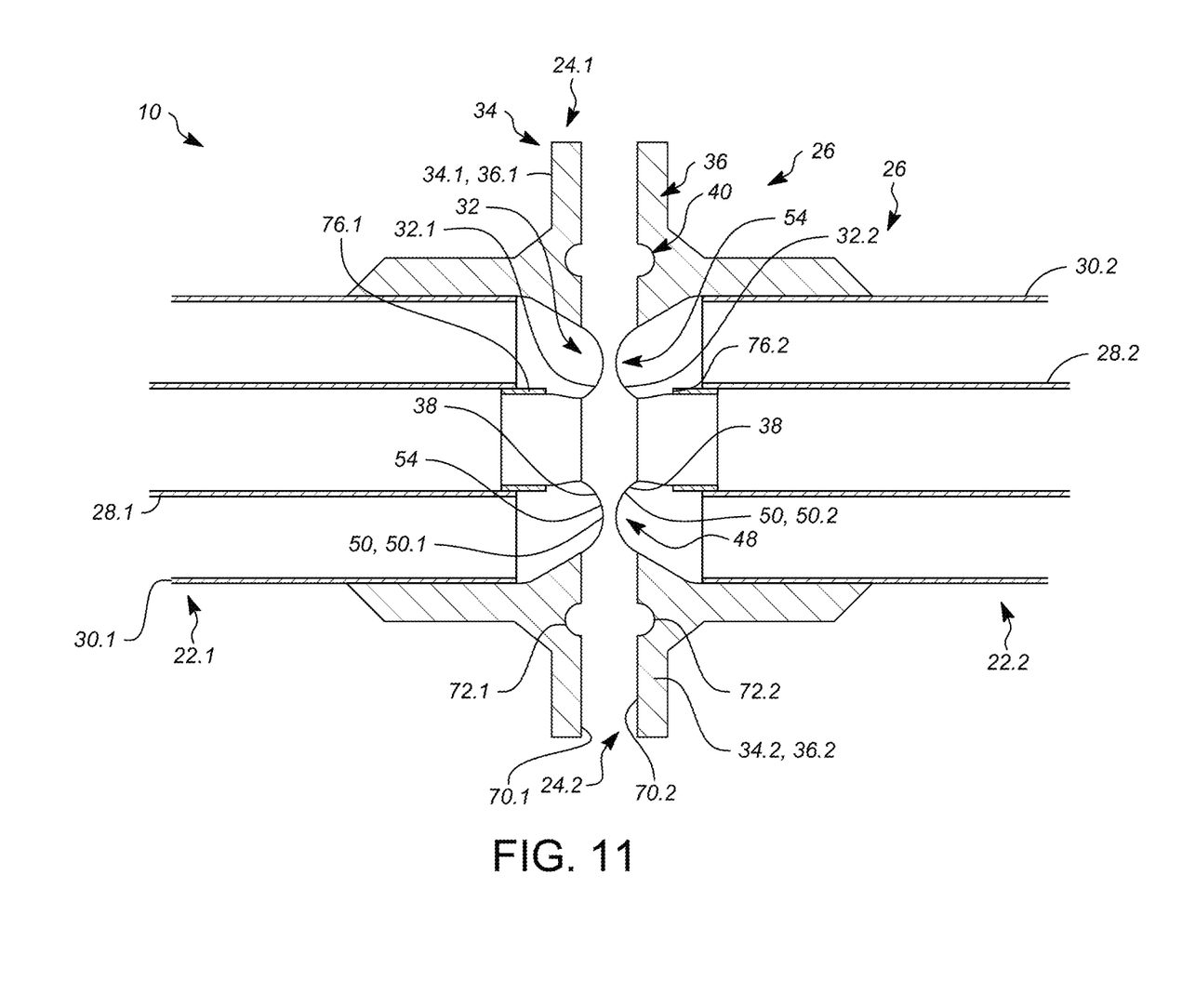
FIG. 11 is a schematic sectional view of a pipe coupling arrangement for conducting $LH_2$ or $GH_2$ according to a third embodiment in an unloaded state before assembling (single flange concept)

Preferably, the inner and outer joint sections are arranged such that, during a coupling operation, first the inner joint sections are pressed together by the elastic force of the at least one spring element before the outer joint sections come into contact with each other (especially embodiments with single flange concept, see for example FIGS. 10 and 11).

Preferably, the inner and outer joint sections are arranged such that at least one of the inner joint sections protrude axially in an unloaded state over the associated outer joint section. In a preferred embodiment, the first inner joint section protrudes axially in an unloaded state (e.g., when the coupling sections are not coupled together) over the first outer joint section, and the second inner section protrudes in the unloaded state over the second outer joint section.

Preferably, the first outer joint section is a first outer flange on the first outer pipe. Preferably, the first outer flange includes a first annular outer sealing seat portion. Preferably, the second joint section is a second outer flange on the second outer pipe. Preferably, the second outer flange has a second annular outer sealing seat portion. Preferably, the outer seal is located between the first and second outer sealing seat. Preferably, the pressing device comprises an outer flange pressing device for pressing the first and second outer flanges together.

Preferably, the pressing device comprises a clamping device. Preferably, the pressing device comprises a clamp ring. Preferably, the pressing device comprises a V-clamp. Preferably, the pressing device comprises a bolted flange connection. Especially, the pressing device is configured to press a first outer flange on the first outer pipe onto a second outer flange on the second outer pipe. Any suitable flange connections generally known for pipe couplings are possible.

Preferably, the first coupling section comprises a first inner flange on the first inner pipe. Preferably, the first inner flange has a first inner annular sealing seat portion. Preferably, the second coupling section comprises a second inner flange on the second inner pipe. Preferably, the second inner flange has a second inner annular sealing seat portion. Preferably, the inner seal is achieved between the first and second inner annular sealing seat portions.

Preferably, the at least one spring element includes a metal bellow. Preferably, the at least one spring element includes a metal bellow on the first inner pipe. Preferably, the at least one spring element includes a metal bellow on the second inner pipe. Preferably, the at least one spring element includes an elastic section of the first inner pipe. Preferably, the at least one spring element includes an elastic section of the second inner pipe. Preferably, the at least one spring element includes a metal below with mushroom shaped windings. Preferably, the at least one spring element includes a metal below with droplet-shaped windings. Preferably, the at least one spring element includes a metal below with honeycomb-shaped windings. Preferably, the at least one spring element includes a pressure spring embedded in an inner flange at the end of one of the inner pipes. Preferably, the at least one spring element includes an elastically deformable inner flange at the end of one of the inner pipes. Preferably, the at least one spring element includes at least one a diaphragm seal protruding from the end of one of the inner pipes towards the other of the inner pipes.

Preferably, the outer seal includes an O-ring. Preferably, the outer seal includes an elastomeric O-ring. Preferably, the outer seal includes a spring energized seal. Preferably, the outer seal includes a PTFE energized seal. Preferably, the outer seal includes a metal seal. Preferably, the outer seal includes a metal O-ring. Preferably, the outer seal includes a metal C-ring. Preferably, the outer seal includes a spring-energized metal seal. Preferably, the outer seal includes a spring energized metal O-ring. Preferably, the outer seal includes a spring energized metal C-ring. Preferably, the outer seal includes a metal gasket.

Preferably, the inner seal includes an O-ring. Preferably, the inner seal includes an elastomeric O-ring. Preferably, the inner seal includes a spring energized seal. Preferably, the inner seal includes a PTFE energized seal. Preferably, the inner seal includes a metal seal. Preferably, the inner seal includes a metal O-ring. Preferably, the inner seal includes a metal C-ring. Preferably, the inner seal includes a spring-energized metal seal. Preferably, the inner seal includes a spring energized metal O-ring. Preferably, the inner seal includes a spring energized metal C-ring. Preferably, the inner seal includes a metal gasket. Preferably, the inner seal includes an and an elastically deformable diaphragm seal.

Preferably, the hydrogen pipe coupling arrangement is configured to be coupled and decoupled easily, especially by releasable mounting of the pressing device.

According to another aspect, the invention provides a hydrogen distributing system comprising at least one hydrogen pipe coupling arrangement according to any of the aforementioned embodiments. The hydrogen distributing system may be a system for distributing liquid $H_2$ or gaseous $H_2$ on board of a vehicle such as an aircraft. Especially, the $H_2$ distribution system is configured to transport $H_2$ from an $H_2$ tank to an $H_2$ consumer such as an engine powered by $H_2$ or a fuel cell powered by $H_2$ and so on. Also, the hydrogen distributing system may be used on a tank vehicle, especially for an airport. Alternatively, the hydrogen distributing system may be a ground system such as an aircraft fuel distribution system on an airport.

According to another aspect, the invention provides a vehicle, especially aircraft, comprising a hydrogen pipe coupling arrangement according to any of the aforementioned embodiments and/or a hydrogen distributing system according to the aforementioned embodiment.

Preferred embodiments of the invention relate to a spring-energized flange concept to increase the seal seating load on the flange of $H_2$ pipe removable coupling connections.

Preferred embodiments of this invention relate to the flange design of removable coupling connections of $H_2$ pipes. Such a connection typically requires a very low leak rate, which is of high importance for $H_2$ applications due to safety and operational reasons. In order to maintain the leak rate requirements, a seal or multiple seals are needed and they require a very high seating load to provide good performance. According to preferred embodiments of this invention, a spring-energized flange concept is proposed to increase the seal seating load.

According to preferred embodiments of the invention relating to a hydrogen distribution system, a doubled walled pipe is used in which liquid hydrogen ($LH_2$) or gaseous hydrogen ($GH_2$) is transported in the inner pipe and the outer pipe is maintained with vacuum condition or inert gas for leak containment and heat insulation. At a coupling connection, a single flange can be used with an inner seal and an outer seal. Alternatively, a double flange concept can also be considered, in which the inner pipes are connected by a separate flange. In this case, each flange has its own seal. The flanges from the opposing pipe sections can be kept together by a V-clamp or a bolted joint. Preferably, a double V-clamp may be used to ensure that the flange is robust enough and a single failure shall not result in loss of system integrity. The seating load on the seals depends on the V-clamp force or the bolt torques, which can be limited for installation reasons. According to preferred embodiments of this invention, it is proposed to use a spring mechanism to increase the seating load on the seals.

Seating loads may be reduced by one effect or a combination of effects like thermal contraction and loading, tolerances, system loads and acceleration forces. Additionally load limitations of connecting elements can limit the seals seating loads.

Another aspect for inner and outer combined flanges (single flange) is that temperature difference between inner and outer pipe wall can result in very high thermal stress concentration at the connection between inner and outer pipe/flange part. To limit the stress concentration, reducing the stiffness locally may improve the situation in regards to stress concentration, but can result in an increased seal grove gap leading to leaks. According to some embodiments, a kind of pre-compressed spring element on the inner flange side can avoid this seal groove gap increase and eliminate the stress concentration.

In preferred embodiments of this invention, a spring energized flange concept is proposed to increase the seal seating load in the coupling connection of $H_2$ pipes. Advantages of preferred embodiments include:

Better seal performance and $H_2$ leak tightness. Low leakage rate is one of the most important requirements for the $H_2$ distribution system to ensure safety and operational continuity.

Better seals that require higher seating load can be used.

Longer duration of vacuum insulation and improvement of maintenance interval in case the flange design allows a small hydrogen leakage into the outer pipe.

In preferred embodiments using a double flange concept, it is proposed to add a mechanical spring on the inner flange. The pipe length and the spring are sized such that the spring will be under compression after the assembly and therefore, will apply an axial force on the inner seal, thus increasing the seating load on the seal. It should be noted that while the spring-energized concept has been shown here for the inner flange, it is not limited to this configuration. The same concept can be applied to other coupling connection arrangements.

Some embodiments use a metal bellow as the spring on the inner flange. Metal bellows are often used as an expansion joint to absorb movements in the pipe system. In this application, however, a metal bellow is used as a spring to provide additional force on the flange. Metal bellows can be welded or bolted onto the pipe. Some embodiments use a conventional metal below as spring element. Other than the conventional metal bellow, further embodiments use other possible spring shapes that can be achieved by 3D printing. For example, the spring can have a mushroom shape that can be optimized for certain stiffness and axial movement. In other embodiments, the spring takes the shape of a water droplet or a honeycomb cell, respectively. These are hollow structures that can provide axial stiffness like a spring. May be, vent holes can be required to vent out the leftover powder inside the droplet and the honeycomb cell after manufacturing.

It is recommended to position the spring as close as possible to the flange, or if possible, the spring could also be integrated to the flange. This will minimize the required spring stiffness, and therefore the weight and the complexity to transfer the axial force to the seal. This will also minimize the interaction between this spring and other thermal/movement compensation bellows on the pipe.

In preferred embodiments using a single flange concept, a bellow spring can also be used for applying a preload to the inner seal. Similar to the double flange concept, the pipes may be installed with pre-tension where the springs are already compressed before the clamping force is applied on the flange. Once the clamping force is applied, the seating load on the seal is provided by the clamping force and the spring force.

In other embodiments, a diaphragm is used as a combined spring and inner seal. The spring force is achieved based on the elasticity of the diaphragm when it is under deformation. The surface of the diaphragm can be machined to obtain good roughness and can act as a sealing surface. A coating layer of softer material could also be used to improve the surface quality and the sealing effectiveness.

It should be noted that possible spring shapes both for bellow type spring elements as for a diaphragm as combined spring and seal element can be made with conventional machining or 3D printing methods.

In preferred embodiments, several different types of seals can be used as inner seal or as outer seal (except for the diaphragm concept where the diaphragm is the seal itself). This includes but is not limited to elastomer O-ring, PTFE spring energized seals, metal seals (O-ring, C-ring, spring-energized) and metal gaskets. The actual seals to be used are selected based on the operating conditions, the technical and installation requirements.

While the flange concepts as indicated in the citations [1] to [6] are meant to increase the compression load on the flange of a single walled pipe, a special technical effect of preferred embodiments of the invention is to increase the compression load on the inner flange or other inner joint connection of a multi-walled, especially double walled, pipe. This enables to improve removable couplings for $H_2$ pipes with regard to $H_2$ leakage, simple construction, simple use and reliability.

While the concept of increasing the sealing seat load has been described on example of the inner seal between the inner pipes, the same principles may also apply additionally to the outer seal. Hence, the outer flanges or other outer joint sections may also be pre-pressed by at least one additional spring element.

BRIEF DESCRIPTION OF THE DRAWINGS

Embodiments of the invention are explained in more detail referring to the accompanying drawings, in which.

DETAILED DESCRIPTION OF THE PREFERRED EMBODIMENTS

Figure 1:
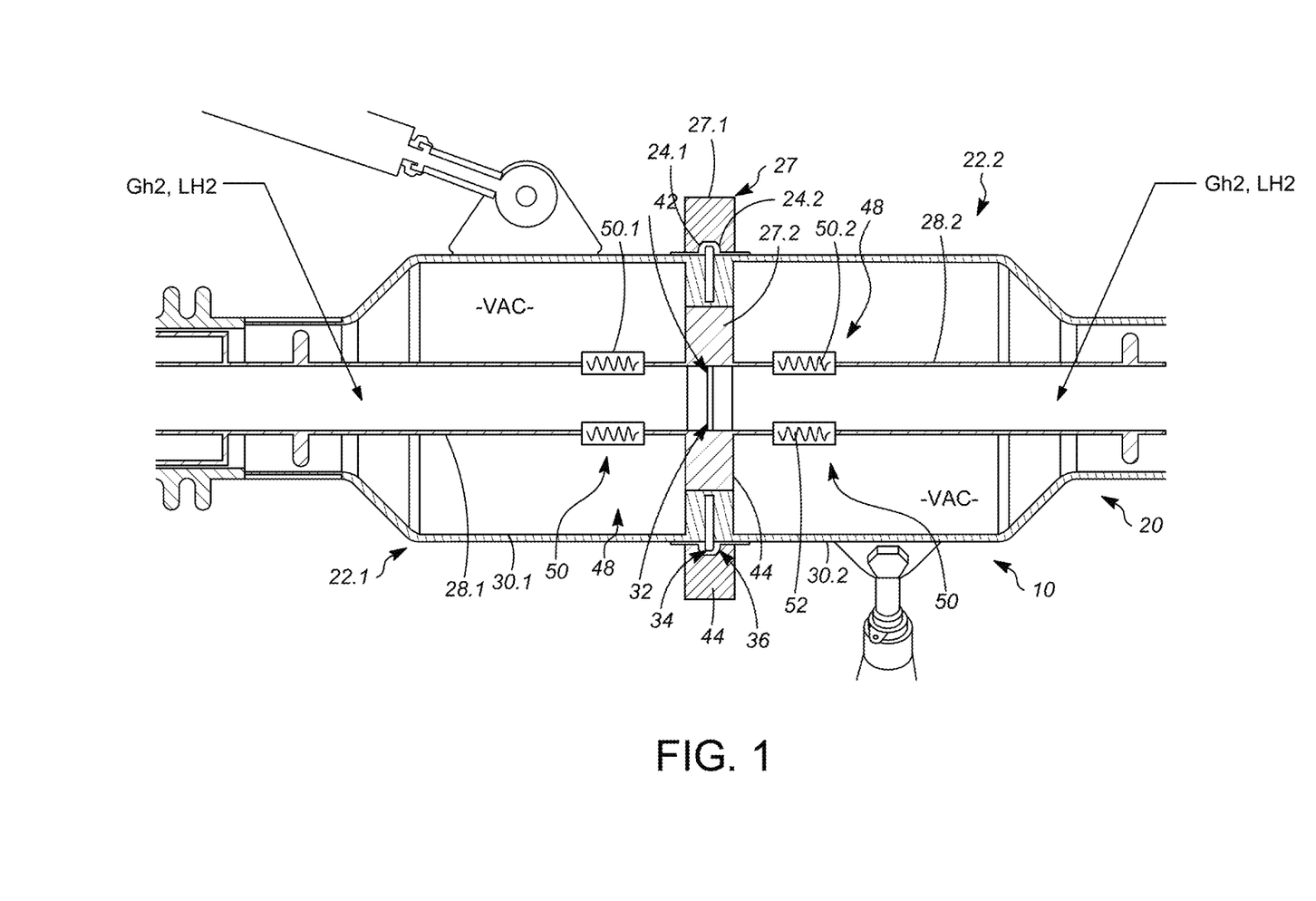
FIG. 1 is a schematic sectional view of a pipe coupling arrangement for conducting liquid $H_2$ ($LH_2$) or gaseous $H_2$ ($GH_2$) according to a first embodiment (double flange concept, two separate flanges)
Figure 2:
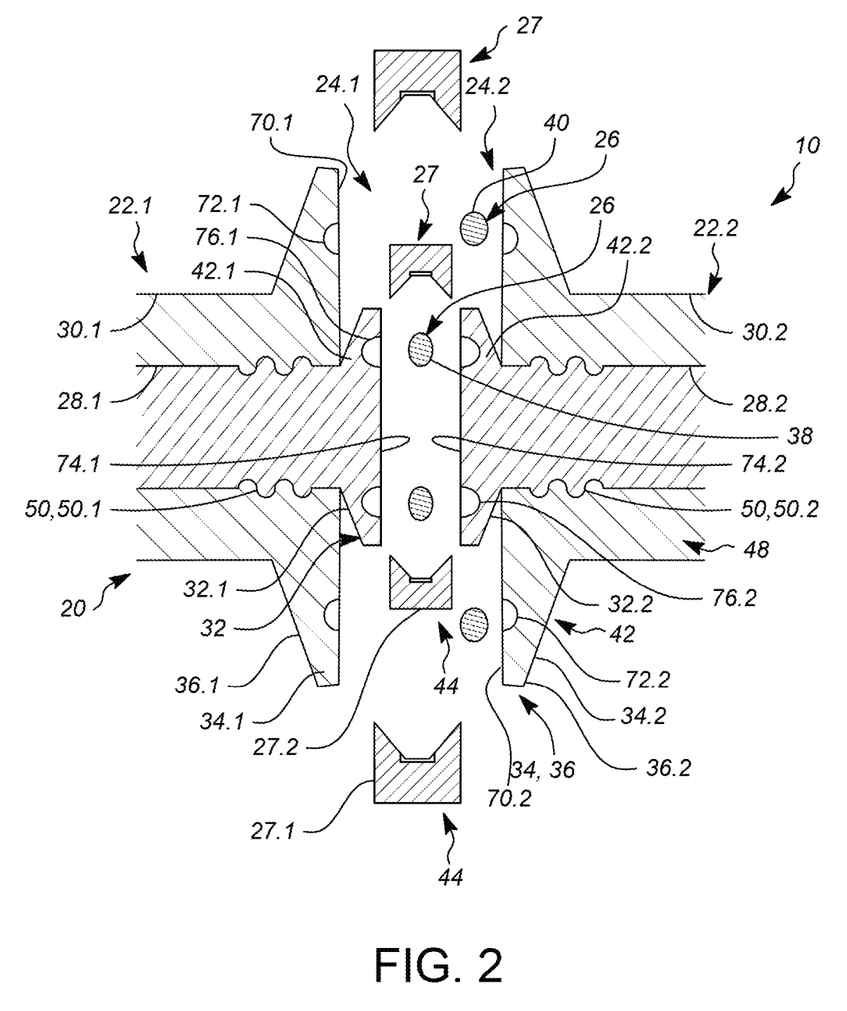
FIG. 2 is a schematic exploded view of the components of the hydrogen pipe coupling arrangement of the first embodiment in an unloaded state before assembling the coupling arrangement (double flange concept, two separate flanges)
Figure 16:
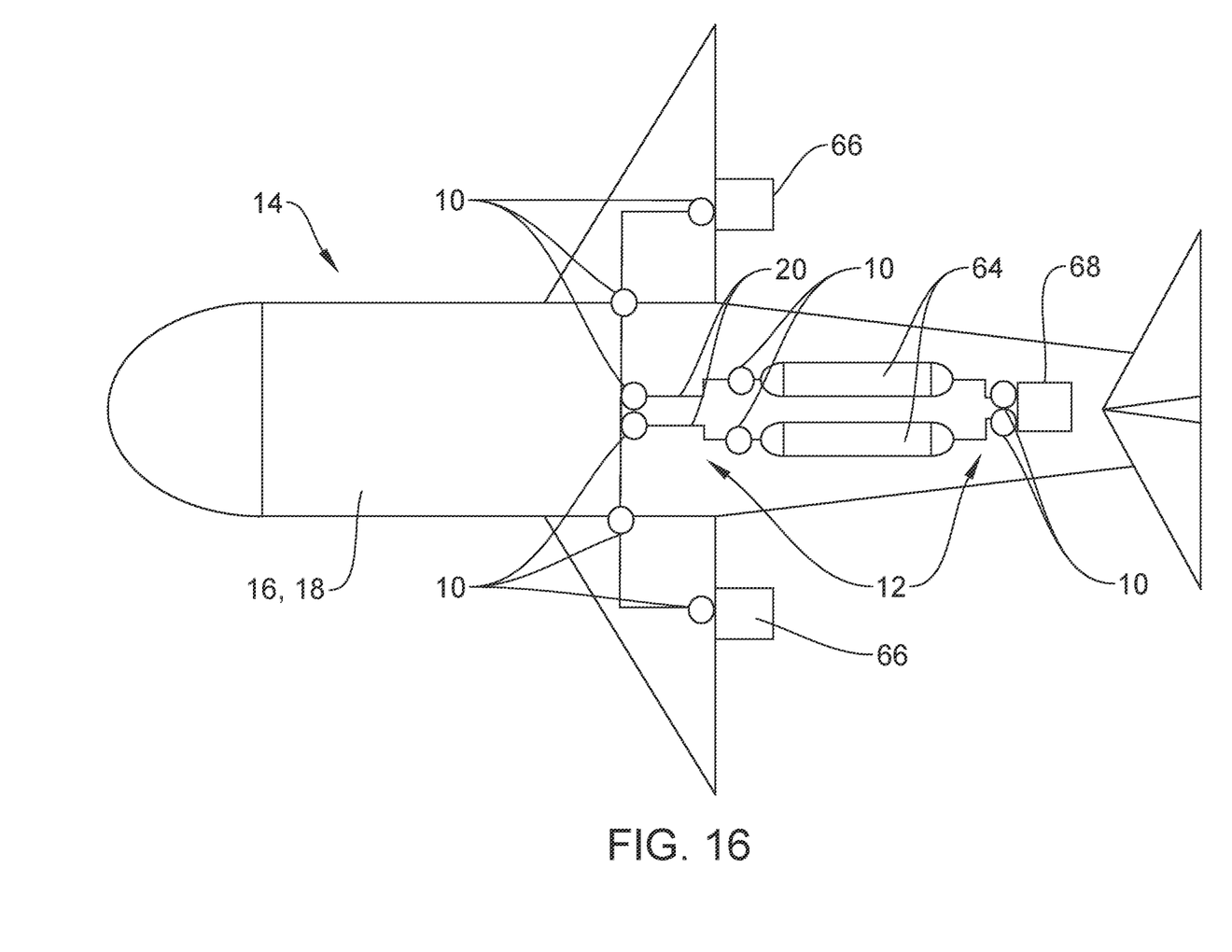
FIG. 16 is a schematic view of an airplane as example for a vehicle equipped with a hydrogen distribution system comprising several hydrogen pipe coupling arrangements according the embodiments of the present invention.

FIGS. 1 and 2 show a first embodiment of a hydrogen pipe coupling arrangement 10; FIG. 10 shows a second embodiment of the hydrogen pipe coupling arrangement 10; and FIG. 11 shows a third embodiment of a hydrogen pipe coupling arrangement 10. As shown in FIG. 16, the hydrogen coupling arrangement 10 is used in a $H_2$ distribution system 12, for example in a vehicle 14 such as an aircraft 16, especially an airplane 18. In the $H_2$ distribution system 12, a multiple-wall pipe, especially a double wall pipe 20 is used in which $LH_2$ or $GH_2$ is transported in an inner pipe 28.1, 28.2 and an outer pipe 30.1, 30.2 is maintained with vacuum (VAC) condition or inert gas for leak containment and heat insulation. In order to be able to exchange several components of the $H_2$ distribution system 12, for example for maintenance or repair, several pipe sections 22.1, 22.2 of the $H_2$ distribution system 12 are removably coupled together. In order to enable such removable coupling, the $H_2$ distribution system 12 is equipped with the hydrogen pipe coupling arrangement 10.

Referring to FIGS. 1, 2, 10, and 11, the hydrogen pipe coupling arrangement comprises a first multiple-wall hydrogen pipe section 22.1 with a first coupling portion 24.1 and a second multiple-wall hydrogen pipe section 22.2 with a second coupling portion 24.2. The coupling portions 24.1, 24.2 are configured to be connected to each other and to be pressed together by a pressing device 27.

Further, hydrogen pipe coupling arrangement 10 comprises a sealing arrangement 26 configured to seal the connection between the first and second coupling portions 24.1, 24.2.

The first multiple-wall hydrogen pipe section 22.1 has a first inner pipe 28.1 and a first outer pipe 30.1 (not connected to each other). The second multiple-wall hydrogen pipe section 22.2 has a second inner pipe 28.2 and a second outer pipe 30.2. The inner pipes 28.1, 28.2 are configured to be connected to each other in fluid communication; and the outer pipes 30.1, 30.2 are configured to be connected to each other, preferably in fluid communication, too.

In order to establish an inner pipe joint 32 between the inner pipes 28.1, 28.2, the first coupling portion 24.1 has a first inner annular joint section 32.1 that is configured to be pressed by means of the pressing device 27 against a second inner annular joint section 32.2 of the second coupling portion 24.2. In order to establish an outer pipe joint 34 between the outer pipes 30.1, 30.2 the first coupling portion 24.1 has a first outer annular joint section 34.1 configured to be pressed by means of the pressing device 27 against a second outer annular joint section 34.2 of the second coupling portion 24.2.

Different types of pipe joints 32, 34 are possible. The embodiments shown in FIGS. 1, 2, 10, and 11 use a flange connection 36, 42 at least for the outer pipe joint 34. For establishing an outer flange connection 36, the first outer joint section 34.1 is a first outer flange 36.1 formed on the first outer pipe 30.1, and the second outer joint section 34.2 is a second outer flange 36.2 formed on the second outer pipe 30.2.

In a single flange concept such as employed in the second and third embodiment shown FIGS. 10 and 11, respectively, a single flange connection—namely the outer flange connection 36—is used at the coupling connection with an inner seal 38 and an outer seal 40 in order to connect the inner pipes 28.1, 28.2 and the outer pipes 30.2. The inner seal 38 is achieved between a first inner sealing seat portion 76.1 on the first coupling portion 24.1 and a second inner sealing seat portion 76.2 on the second coupling portion 24.2. The outer seal 40 is achieved between a first outer sealing seat portion 72.1 on the first coupling portion 24.1 and a second outer sealing seat portion 72.2 on the second coupling portion 24.2.

In the first embodiment of FIGS. 1 and 2, a multiple-flange concept, especially a double flange concept, is used. Inner flanges 42.1, 42.2 are separate from and not connected to the outer flanges 36.1, 36.2. The outer pipes 30.1, 30.2 are connected by connecting the outer flanges 36.1, 36.2 with an outer flange pressing device 27.1. A separate inner flange connection 42 connects the inner pipes 28.1, 28.2. In this embodiment, the first inner joint section 32.1 is a first inner flange 42.1 formed on the first inner pipe 28.1, and the second inner joint section 32.2 is a second inner flange 42.2 formed on the second inner pipe 28.2. The inner flanges 42.1, 42.2 are pressed together by an inner flange pressing device 27.2.

The first inner flange 42.1 has a first inner end surface 74.1 provided with the first inner annular sealing seat portion 76.1, e.g., in form of a groove. The second inner flange 42.2 has a second inner end surface 74.2 provided with the second inner annular sealing seat portion 76.2, e.g., in form of a groove.

The first outer flange 36.1 has a first outer end surface 70.1 facing a corresponding second outer end surface 70.2 on the second outer flange 36.1. The first outer end surface 70.1 is provided with the first annular outer sealing seat portion 72.1. The second outer end surface 70.2 is provided with the second annular outer sealing seat portion 72.2. In the embodiments shown, the outer sealing seat portions 72.1, 72.1 have the shape of a groove in the associated outer end surface 70.1, 70.2.

Figure 3:
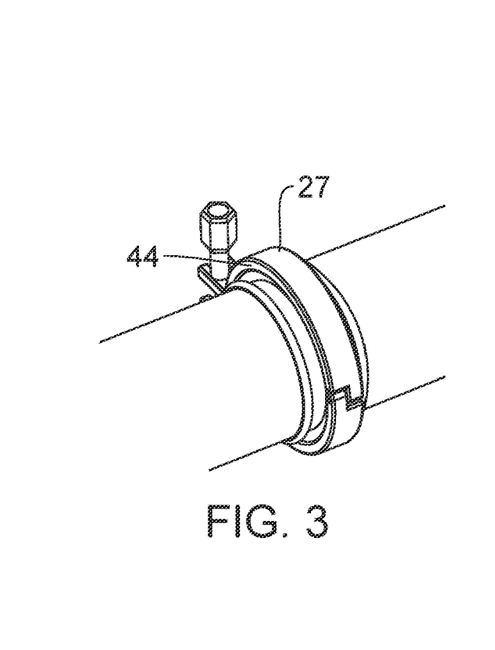
FIG. 3 is a perspective view of a first example for a pressing device in form of a clamping device clamping two pipe sections together.
Figure 4:
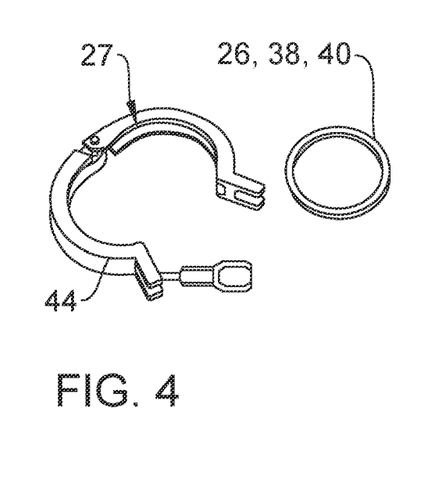
FIG. 4 is a perspective view of the clamping device and a seal
Figure 5:
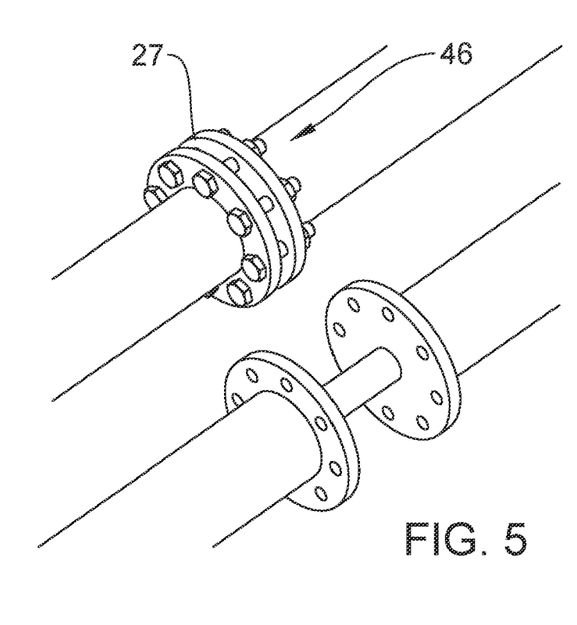
FIG. 5 is a perspective view of a second example of a pressing device in form of a bolt connection for pressing flanges of two pipe sections together.

FIGS. 3 and 4 show a first example for the pressing devices 27, 27.1, 27.2 wherein the pressing device 27, 27.1, 27.2 comprises a clamping device 44. In preferred embodiments, the clamping device 44 comprises a V-clamp for clamping the respective flanges 36.1, 36.2; 42.1, 42.2 together. FIG. 5 shows a further example for the pressing devices 27, 27.1, 27.2 in the form of a bolted joint 46 wherein the respective flanges 36.1, 36.2; 42.1, 42.2 are pressed together by several bolts distributed over the circumference of the flange connection 36, 42.

Referring now to all of the FIGS. 1, 2, 10, and 11 again, the sealing arrangement 26 comprises the inner seal 38 configured to seal the inner pipe joint 32 and the outer seal 40 configured to seal the outer pipe joint 34. The inner seal 38 is achieved between the inner sealing seat portions 76.1, 76.2. The outer seal 40 is achieved between the outer sealing seat portions 72.1, 72.2.

The seating load on the seals 38, 40 depends on the pressing force of the pressing device 27, 27.1, 27.2. The pressing force of the pressing device 27, 27.1, 27.2 is dependent from the clamp force of the clamping device or the torque of the bolts of the bolted joint 46 which may be limited for installation reasons.

Referring to FIGS. 1, 2, 10, and 11, the hydrogen pipe coupling arrangement 10 comprises a spring mechanism 48 to increase the seating load at least on the inner seal 38. Especially, the hydrogen pipe coupling arrangement 10 comprises at least one spring element 50 configured to apply a pre-pressing force onto the inner seal 38 in addition to the pressing force of the pressing device. In embodiments not shown, the spring mechanism 48 comprises just one spring element 50 for biasing one of the inner joint sections 32.1, 32.2 onto the other of the inner joint sections. In the embodiments shown in FIGS. 1, 2, 10, and 11, the spring mechanism 48 comprises a first spring element 50.1 and a second spring element 50.2. The first spring element 50.1 is configured to elastically support the first inner joint section 32.1 in an axial direction and/or to bias the first inner joint section 32.1 towards the second inner joint section 32.2. The second spring element 50.1 is configured to elastically support the second inner joint section 32.2 in an axial direction and/or to bias the second inner joint section 32.2 towards the second inner joint section 32.2.

In the first embodiment as shown in FIGS. 1 and 2 embodying a double flange concept, a mechanical spring is added as spring element 50, 50.1, 50.2 on at least one of the inner flanges 42.1, 42.2. The lengths of the pipes 28.1, 28.2, 30.1, 30.2 and the spring element(s) 50, 50.1, 50.2 are sized such that the spring element 50, 50.1, 50.2 will be under compression after assembly of the hydrogen pipe coupling arrangement 10 and therefore will apply an axial force on the inner seal 38 thus increasing the seating load on the inner seal 38.

In the first to third embodiments as shown in the Figures, the inner joint sections 32.1, 32.2 protrude axially in an unloaded state—as shown in FIGS. 2, 10 and 11—over the associated outer joint section 34.1, 34.2. In other embodiments (not shown), the inner joint sections 32.1, 32.2 may be axially shifted with regard to the outer joint sections 34.1, 34.2 as this is, e.g., known from [7]. Generally, the inner joint sections 32.1, 32.2 are closer to each other compared the outer joint sections in a state shortly before coupling (such as shown in FIGS. 2, 10, 11), wherein at least one of the inner joint sections 32.1, 32.2 is elastically supported by the at least one spring element 50, 50.1, 50.2. During a coupling operation, first the inner joint sections 32.1, 32.2 are pressed together by the elastic force of the at least one spring element 50, 50.1, 50.2 before the outer joint sections 34.1, 34.2 come into contact with each other. Thus, the spring element(s) 50, 50.1, 50.2 are compressed during the coupling and exert an additional pressing force onto the inner seal 38.

FIGS. 6 to 9 show different examples for shapes of the spring element 50, 50.2. Referring to FIGS. 1, 2, 6 and 10, a metal bellow 52 is used as the spring element 50, 50.1, 50.2 on the inner joint section 32.1, 32.2 such as the inner flanges 42.1, 42.2. Metal bellows are sometimes used in pipe systems for other purposes, e.g., an expansion joint to absorb movements. In the application as presented here, however, the metal bellow 52 is used as a mechanical spring to provide an additional force on the joint sections 32.1, 32.2 of the inner pipe joint 32. The metal bellow 52 can be welded or bolted onto the inner pipe 28.1, 28.2.

Figures 6, 7:
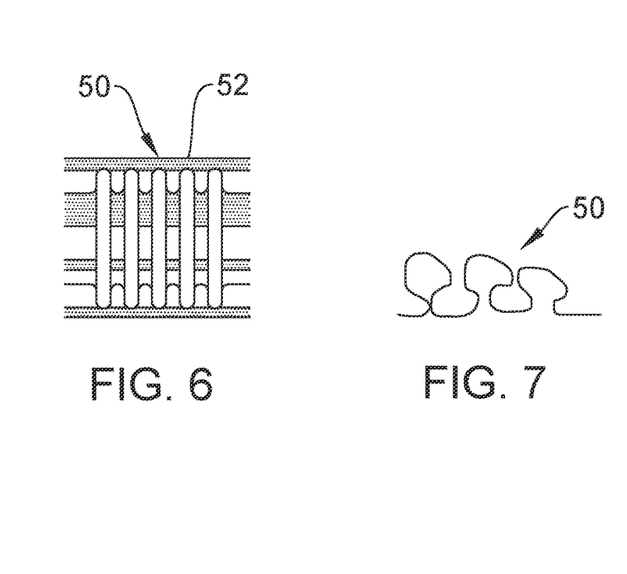
FIG. 6 is a sectional view of a first embodiment of a spring element of the pipe coupling arrangement of FIGS. 1 and 2.
FIG. 7 is a sectional partial view of a second embodiment of a spring element of the pipe coupling arrangement of FIGS. 1 and 2.
Figure 8:
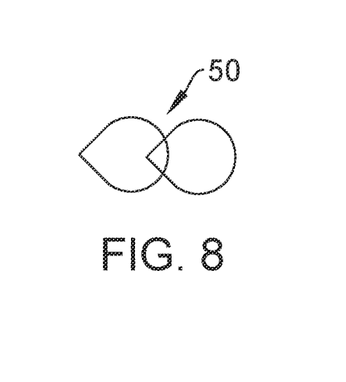
FIG. 8 is a sectional view of a third embodiment of a spring element of the pipe coupling arrangement of FIGS. 1 and 2.
Figure 9:
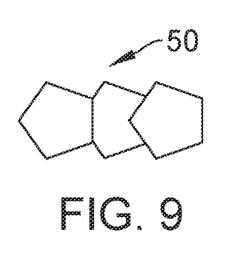
FIG. 9 is a sectional view of a fourth embodiment of a spring element of the pipe coupling arrangement of FIGS. 1 and 2.

As shown in FIG. 6, the metal bellow 52 can be a conventional metal bellow with a regular sinus like wave form of the metal bellow windings. Other than the conventional metal bellow as shown in FIG. 6, other spring shapes are possible. Examples thereof are shown in FIGS. 7 to 9. The metal bellow 52 can have mushroom shaped windings as shown in FIG. 7. This form can be optimized for certain stiffness and axial movement. Referring to FIGS. 8 and 9, the spring element 50, 50.1, 50.2 can take the form of water droplets or of honeycomb cells, respectively. These are hollow structures that can provide axial stiffness like a spring. The spring forms as shown in FIGS. 7 to 9 can be made by 3D printing. Vent holes may be required to vent out the leftover powder inside the 3D printed hollow structures after manufacturing.

It is recommended to position the spring element 50, 50.1, 50.2 as close as possible to the corresponding inner joint section 32.1, 32.1 such as the associated inner flange 42.1, 42.2. This will minimize the required spring stiffness and therefore the weight and the complexity to transfer the axial force onto the inner seal 38. This will also minimize the interaction between the spring element 50, 50.1, 50.2 and other thermal/movement compensation means on the associated pipe 28.1, 28.2. According to some embodiments, the spring element 50, 50.1, 50.2 is integrated into the associated inner joint section 32.1, 32.2. For example, inner flanges 42.1, 42.2 may be at least partially elastic. According to other examples, the inner end surfaces 74.1, 74.2 are formed on a movable flange wall part supported elastically by the spring element 50.

FIG. 10 shows a second embodiment of the hydrogen pipe coupling arrangement 10 employing the single flange connection concept. As shown in FIG. 10, the spring elements 50, 50.1, 50.2 can also be used in such a single flange connection concept in order to exert an additional seat load on the inner seal 38. For example, the inner joint sections 32.1, 32.2 are formed by ends of the metal bellows 52 of the first and second spring element 50.1, 50.2. The axial end surface of the metal bellows form the inner end surfaces 74.1, 74.2 with the inner sealing seat portions 76.1, 76.2. As in the double flange concept shown in FIGS. 1 and 2, the inner pipes 28.1, 28.2 are installed with pre-tension where the spring element(s) 50, 50.1, 50.2 is/are already compressed before the pressing force such as the clamping force is applied on the (outer) flanges 36.1, 36.2. Once the pressing force is applied, the seating load on the inner seal 38 is provided by the pressing force of the pressing device 27 and by the spring force of the at least one spring element 50, 50.1, 50.2.

FIG. 11 shows a third embodiment of the hydrogen pipe coupling arrangement 10 employing the single flange connection concept in another configuration. H ere, a diaphragm 54 is used as a combined spring element 50, 50.1, 50.2 and inner seal 38. The spring force is achieved based on the elasticity of the diaphragm 54 when it is used under deformation. In some embodiments, the surface of the diaphragm 54 is machined in order to obtain a good roughness and can act as a sealing surface. In some embodiments a coating layer of softer material (not shown) is use to improve the surface quality and the sealing effectiveness.

The spring shapes as shown in FIGS. 10 and 11 can be made with conventional machining or with 3D printing methods.

Figure 12:
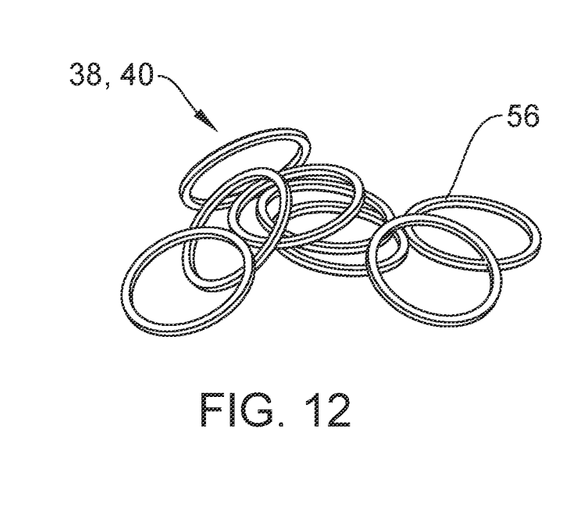
FIG. 12 is a perspective view showing several seals according to a first example that can be used in the hydrogen pipe coupling arrangement according to the first to third embodiments.
Figure 13:
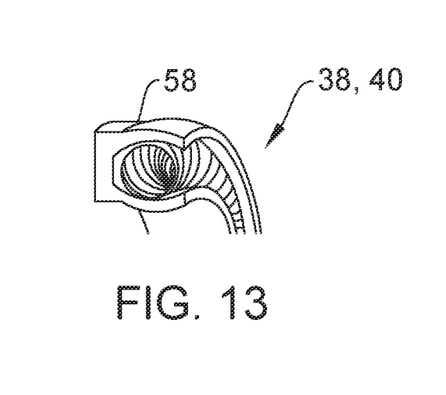
FIG. 13 is a perspective and sectional view of a seal according to a second example that can be used in the hydrogen pipe coupling arrangement according to the first to third embodiments.
Figure 14:
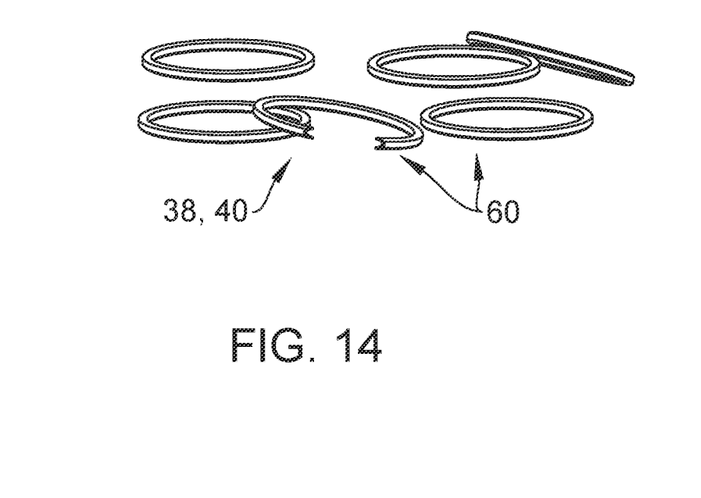
FIG. 14 is a perspective view showing several seals according to a third example that can be used in the hydrogen pipe coupling arrangement according to the first to third embodiments.
Figure 15:
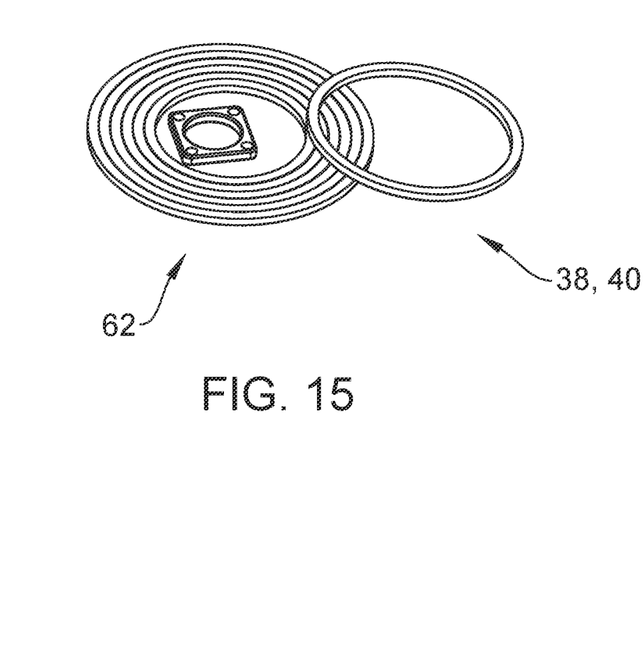
FIG. 15 is a perspective view showing several seals according to a further example that can be used in the hydrogen pipe coupling arrangement according to the first to third embodiments.

FIGS. 12 to 15 show different examples of seals that can be used as outer seals 40 and inner seals 38 (except for the diaphragm design of the inner seal as shown in FIG. 11 where the spring element 50, 50.1, 50.2 can also function as inner seal 38). The seals 40, 38 can be elastomer O-rings 56 as shown in FIG. 12, PTFE spring energized seals 58 as shown in FIG. 13, metallic seals 60 in the form of metallic O-rings or C-rings as shown in FIG. 14 or metal gaskets 62 in different shapes and forms as shown in FIG. 15.

FIG. 16 shows schematically the vehicle 14 in form of an aircraft with the H2 distribution system 12. The aircraft 16 includes $H_2$ tanks 64 and $H_2$ consumers such as engines 66 and fuel cells 68. The $H_2$ distribution system 12 distributes $H_2$ from and to the $H_2$ tanks 64 and to the $H_2$ consumers 66, 68. Pipe sections 22.1, 22.2 of the pipes of the $H_2$ distribution system 12 can be coupled and decoupled by use of the hydrogen pipe coupling arrangement 10 according to any of the aforementioned embodiments at different locations. Although not shown, other embodiments of the $H_2$ distribution system 10 are configured as ground systems, e.g., at airports, heliports or $H_2$ fueling stations or as $H_2$ distributions systems on board of ground vehicles or sea vessels.

In order to enhance the sealing of a coupling for a hydrogen pipe, a coupling for coupling multi-wall pipe sections (22.1, 22.2) has been proposed which is equipped with an inner seal (38) and an outer seal (40) and a pressing device (27, 27.1, 27.2) that presses the pipe sections together. The hydrogen pipe coupling arrangement (10) comprises at least one spring element (50, 50.1, 50.2) configured to apply a pre-pressing force onto the inner seal (38) in addition to a pressing force of the pressing device (27, 27.1, 27.2).

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 hydrogen pipe coupling arrangement
12 $H_2$ distribution system
14 vehicle
16 aircraft
18 airplane
20 double wall pipe
22.1 first multiple-wall hydrogen pipe section
22.2 second multiple-wall hydrogen pipe section
24.1 first coupling portion
24.2 second coupling portion
26 sealing arrangement
27 pressing device
27.1 outer flange pressing device
27.2 inner flange pressing device
28.1 first inner pipe
28.2 second inner pipe
30.1 first outer pipe
30.2 second outer pipe
32 inner pipe joint
32.1 first inner joint section
32.2 second inner joint section
34 outer pipe joint
34.1 first outer joint section
34.2 second outer joint section
36 outer flange connection
36.1 first outer flange
36.2 second outer flange
38 inner seal
40 outer seal
42 inner flange connection
42.1 first inner flange
42.2 second inner flange
44 clamping device
46 bolted joint
48 spring mechanism
50 spring element
50.1 first spring element
50.2 second spring element
52 metal bellow
54 diaphragm
56 elastomer O-ring
58 PTFE spring energized seal
60 metallic seals (O-ring, C-ring)
62 metal gasket
64 $H_2$ tanks
66 engine
68 fuel cell
70.1 first outer end surface
70.2 second outer end surface
72.1 first outer sealing seat portion
72.2 second outer sealing seat portion
74.1 first inner end surface
74.2 second inner end surface
76.1 first inner sealing seat portion
76.2 second inner sealing seat portion
$GH_2$ gaseous hydrogen
$LH_2$ liquid hydrogen
VAC vacuum

The invention claimed is:
1. A hydrogen pipe coupling arrangement comprising:
a first multiple-wall hydrogen pipe section with a first coupling portion,
a second multiple-wall hydrogen pipe section with a second coupling portion configured to be connected to the first coupling portion,
a sealing arrangement for sealing a connection between the first and second coupling portions,
a pressing device for pressing the first coupling portion and the second coupling portion together,
the first multiple-wall hydrogen pipe section having a first inner pipe and a first outer pipe wherein the first coupling portion comprises an annular first inner joint section on the first inner pipe and an annular first outer joint section on the first outer pipe,
the second multiple-wall hydrogen pipe section having a second inner pipe to be connected in fluid-communication to the first inner pipe and a second outer pipe to be connected to the first outer pipe,
the second coupling portion having an annular second inner joint section on the second inner pipe configured to be connected with the first inner joint section to form an inner pipe joint and an annular second outer joint section on the second outer pipe configured to be connected with the first outer joint section in order to form an outer pipe joint, the sealing arrangement having an inner seal configured to seal the inner pipe joint and an outer seal configured to seal the outer pipe joint, the hydrogen pipe coupling arrangement further comprising a spring element configured to apply a pre-pressing force onto the inner seal by biasing at least one of the first inner joint section or the second inner joint towards the other of the first inner joint section or the second inner joint section in addition to a pressing force of the pressing device, wherein the first outer joint section is a first outer flange on the first outer pipe with an annular first outer sealing seat portion for achieving the outer seal and that the second outer joint section is a second outer flange on the second outer pipe with an annular second outer sealing seat portion for achieving the outer seal, wherein the pressing device comprises an outer flange pressing device for pressing the first and second outer flanges together.

2. The hydrogen pipe coupling arrangement according to claim 1, wherein at least one of the first and second inner joint sections is elastically supported in an axial direction by the spring element.

3. The hydrogen pipe coupling arrangement according to claim 1, wherein the first and second inner and outer joint sections are arranged such that in an uncoupled state, the first and second inner joint sections are closer to each other than the first and second outer joint sections, wherein at least one of the first and second inner joint sections is elastically supported by the spring element, arranged such that during a coupling operation, first the inner joint sections are pressed together by the elastic force of the spring element before the first and second outer joint sections come into contact with each other, or arranged such that at least one of the first and second inner joint sections protrudes axially in an unloaded state over the associated first and second outer joint section, or any combination thereof.

4. The hydrogen pipe coupling arrangement according to claim 1, wherein the pressing device is selected from a group consisting of: a clamping device, a clamp ring, a V-clamp, and a bolted flange connection.

5. The hydrogen pipe coupling arrangement according to claim 1, wherein the first coupling portion comprises a first inner flange on the first inner pipe with an annular first inner sealing seat portion, wherein the second coupling portion comprises a second inner flange on the second inner pipe with an annular second inner sealing seat portion, and wherein the inner seal is achieved between the first and second inner annular sealing seat portions.

6. The hydrogen pipe coupling arrangement according to claim 1, wherein the spring element is selected from a group consisting of: a metal bellow, a metal bellow on the first inner pipe, a metal bellow on the second inner pipe, an elastic section of the first inner pipe, an elastic section of the second inner pipe, a metal below with mushroom shaped windings, a metal below with droplet-shaped windings, a metal below with honeycomb-shaped windings, a pressure spring embedded in an inner flange at an end of one of the first and second inner pipes, an elastically deformable inner flange at an end of one of the first and second inner pipes, and a diaphragm seal protruding from an end of one of the first and second inner pipes towards the other of the first and second inner pipes.

7. The hydrogen pipe coupling arrangement according to claim 1, wherein the outer seal, the inner seal, or both are selected from a group consisting of: an O-ring, an elastomeric O-ring, a spring energized seal, a PTFE spring energized seal, a metal seal, a metal O-ring, a metal C-ring, a spring-energized metal seal, a spring energized metal O-ring, a spring energized metal C-ring, a metal gasket, and an elastically deformable diaphragm seal.

8. A hydrogen distributing system comprising:
the hydrogen pipe coupling arrangement according to claim 1.

9. A vehicle comprising:
the hydrogen pipe coupling arrangement according to claim 1.

* * * * *